US008567207B2

(12) United States Patent
Sommer et al.

(10) Patent No.: US 8,567,207 B2
(45) Date of Patent: Oct. 29, 2013

(54) COMPRESSOR CONTROL SYSTEM USING A VARIABLE GEOMETRY DIFFUSER

(75) Inventors: Steven Trent Sommer, York, PA (US); John Trevino, Jr., York, PA (US); Florin Iancu, York, PA (US); Rudy Chervil, Mountville, PA (US); Eric John Smyder, York, PA (US)

(73) Assignee: Johnson Controls & Technology Company, Holland, MI (US)

( * ) Notice: Subject to any disclaimer, the term of this patent is extended or adjusted under 35 U.S.C. 154(b) by 804 days.

(21) Appl. No.: 12/681,686

(22) PCT Filed: Oct. 30, 2008

(86) PCT No.: PCT/US2008/081747
§ 371 (c)(1),
(2), (4) Date: Apr. 5, 2010

(87) PCT Pub. No.: WO2009/058975
PCT Pub. Date: May 7, 2009

(65) Prior Publication Data
US 2011/0048046 A1 Mar. 3, 2011

Related U.S. Application Data

(60) Provisional application No. 60/984,073, filed on Oct. 31, 2007.

(51) Int. Cl.
*F25B 1/00* (2006.01)
(52) U.S. Cl.
USPC ....... 62/228.1; 62/196.1; 62/228.4; 62/228.5; 415/47; 415/150

(58) Field of Classification Search
USPC ........ 62/196.1, 228.1, 228.4, 228.5; 415/146, 415/148, 1, 17, 26, 28, 6, 42, 46–49, 150
See application file for complete search history.

(56) References Cited

U.S. PATENT DOCUMENTS

| 3,727,406 A | 4/1973 | LeFeuvre |
| 4,306,417 A | 12/1981 | Binstock et al. |
| 4,378,194 A | 3/1983 | Bandukwalla |
| 4,503,684 A | 3/1985 | Mount et al. |
| 4,616,483 A * | 10/1986 | Leonard .......................... 62/115 |

(Continued)

FOREIGN PATENT DOCUMENTS

| EP | 1321679 A1 | 6/2003 |
| JP | 54076703 A | 6/1979 |

*Primary Examiner* — Cheryl J Tyler
*Assistant Examiner* — Jonathan Bradford
(74) *Attorney, Agent, or Firm* — McNees Wallace & Nurick LLC

(57) ABSTRACT

A system for controlling a centrifugal gas compressor (108) in an HVAC, refrigeration or liquid chiller system (100) in which flow of gas through the compressor is automatically controlled to maintain desired parameters within predetermined ranges so as to prevent stall and surge conditions within the system. A variable geometry diffuser (119) in the compressor controls the refrigerant gas flow at the discharge of the compressor impeller wheel (201). This arrangement reduces mass flow, decrease/eliminate flow-reducing stall, and increases the operating efficiency of the compressor at partial load conditions. The variable geometry diffuser control in combination with a variable speed drive (VSD) (120) increases the efficiency of the compressor at partial system loads, and eliminates the need for pre-rotation vanes at the inlet of the centrifugal compressor.

27 Claims, 10 Drawing Sheets

(56) References Cited

U.S. PATENT DOCUMENTS

| | | |
|---|---|---|
| 4,843,824 A | 7/1989 | Mushines |
| 5,146,764 A | 9/1992 | Bauman et al. |
| 5,203,160 A | 4/1993 | Ozono |
| 5,669,225 A | 9/1997 | Beaverson et al. |
| 5,709,531 A * | 1/1998 | Nishida et al. ............ 415/208.2 |
| 5,746,062 A | 5/1998 | Beaverson et al. |
| 5,894,736 A | 4/1999 | Beaverson et al. |
| 6,050,083 A | 4/2000 | Meckler |
| 6,202,431 B1 | 3/2001 | Beaverson et al. |
| 6,427,464 B1 * | 8/2002 | Beaverson et al. .......... 62/196.3 |
| 6,427,646 B2 | 8/2002 | Galka et al. |
| 6,691,525 B2 | 2/2004 | Beaverson et al. |
| 6,857,845 B2 | 2/2005 | Stabley et al. |
| 6,872,050 B2 | 3/2005 | Nenstiel |
| 7,174,716 B2 | 2/2007 | Brasz et al. |
| 7,254,949 B2 | 8/2007 | Brasz et al. |
| 2002/0014088 A1 | 2/2002 | Seki et al. |
| 2005/0076656 A1 | 4/2005 | Bodell, II et al. |
| 2005/0160748 A1 | 7/2005 | Shaffer et al. |
| 2005/0160749 A1 | 7/2005 | Shaffer et al. |
| 2005/0160750 A1 | 7/2005 | Shaffer et al. |
| 2007/0228320 A1 * | 10/2007 | Minor et al. .................... 252/67 |

* cited by examiner

COMPRESSOR CONTROL SYSTEM USING A VARIABLE GEOMETRY DIFFUSER

CROSS-REFERENCE TO RELATED APPLICATIONS

This application claims priority from and the benefit of U.S. Provisional Application No. 60/984,073, entitled VARIABLE GEOMETRY DIFFUSERS AS CAPACITY CONTROL, filed Oct. 31, 2007, which is hereby incorporated by reference.

BACKGROUND

The application generally relates to a capacity control system for a centrifugal compressor having one or more stages. The application relates more specifically to a capacity control system for a compressor having a Variable Geometry Diffuser (VGD). In a refrigeration system capacity refers to cooling ability, while in other gas compression systems, capacity refers to volumetric flow.

Previously, in centrifugal compressors for use in cooling systems, such as liquid chillers, refrigeration or heating, ventilation, air conditioning and refrigeration (HVAC & R), and gas compression, pre-rotation vanes (PRV) or inlet guide vanes were required for controlling the cooling capacity of the cooling system. At the inlet to the compressor from an evaporator, one or more PRV control the flow of refrigerant to the compressor. An actuator is used to open the PRV to increase the amount of refrigerant to the compressor and thereby increase the cooling capacity of the system. Similarly, the actuator is used to close the PRV to decrease the amount of refrigerant to the compressor and thereby decrease the cooling capacity of the system.

VGDs have been used for controlling rotating stall in the diffuser region of the centrifugal compressor. One embodiment of a VGD is described in U.S. Pat. No. 6,872,050 to Nenstiel, assigned to the assignee of the present invention and incorporated herein by reference. A VGD is extended into the diffuser passage of the centrifugal compressor until a level of the measured signal drops below a predetermined threshold. The result is the elimination of stall and a corresponding drop in both internal and airborne sound levels. After a time, or a change in conditions, the diffuser gap is re-opened in steps or increments, until a level of the measured signal indicates that a stall condition is detected.

Stall and surge conditions are different physical phenomena that represent the extreme operating conditions of compressors. Stall is a local flow separation in one or more components of a compressor, and is characterized by discharge pressure disturbances at fundamental frequencies less than the rotational frequency of the impeller. Rotating stall in a centrifugal compressor is predominantly located in the diffuser and can be eliminated with the VGD. In contrast, surge is a system wide instability in a compressed gas system. The main flow in the compressor is momentarily reversed in direction and the surge is further characterized by even lower frequency, large pressure fluctuations.

A VGD includes a ring that can move to occupy a diffuser gap, which is an outlet flow path for compressed gas. The VGD can move from a retracted position, in which the ring is completely out of the outlet flow path to allow maximum gas flow, to an extended position, in which the ring occupies a portion of the outlet flow path, thereby restricting a portion of the gas flow. The ring is operable based on detection of conditions of stall in the centrifugal compressor. The variable geometry diffuser is used in conjunction with a probe or sensor that measures the alternating component of the discharge pressure to detect impending stall. The measured parameter is transmitted to a controller that is programmed to detect imminent stall based on this measured parameter. The controller then determines when it is necessary to activate the variable geometry diffuser in order to eliminate stall and as a consequence avoid surge. Thus, variable geometry diffusers have provided the advantage of stall avoidance, surge avoidance and reduction in noise that accompanies these conditions.

As part of a diffuser system within a centrifugal compressor, there are many options to recover static pressure downstream of the rotating impeller. The diffuser is responsible for reducing primarily the tangential component of refrigerant velocity, and secondarily, the radial component of refrigerant velocity. As the refrigerant velocity is reduced, the static pressure increases. A primary goal, where performance is critical, is to recover the static pressure with minimal total pressure losses.

Traditional diffusers in centrifugal compressors include vaneless, vaned (airfoil, wedge, high solidity or low solidity), pipe, tunnel and channel or a combination of these types. Each type of diffuser has its advantages and disadvantages. For example, vaneless diffusers consist of two walls, with no vanes on the high pressure side of the impeller. Static pressure recovery within a vaneless diffuser is a result of known relationships between entering velocity conditions and the radius ratio and width throughout the diffuser.

Various methods have been applied individually and in combination for capacity control, including PRV, also known as inlet guide vanes, pre-swirl vanes, etc. on the low pressure side of the impeller, variable speed drives, hot gas bypass, variable diffuser vanes and suction throttle valves. Each of these capacity control methods provides advantages and limitations. The most commonly utilized capacity control methods include PRV, hot gas bypass and variable speed drives.

SUMMARY

In one embodiment a method of controlling the capacity of a gas compression system is disclosed. The gas compression system includes a compressor, a refrigerant condenser, and an evaporator connected in a refrigerant loop. The method includes providing a diffuser at a compressor discharge; sensing a value representative of a load of the gas compression system; determining a system pressure differential of the gas compression system; and controlling a position of the diffuser in response to the sensed load value and the determined system pressure differential to control a capacity of the gas compression system.

In another embodiment a gas compression system includes a gas compression includes a compressor, a refrigerant condenser, and an evaporator connected in a refrigerant loop. The gas compression system includes a diffuser disposed at a discharge of the compressor. The diffuser is arranged to regulate flow of refrigerant from the compressor. A central control panel gas compression system includes a capacity control system. The capacity control system is arranged to adjust a position of the diffuser to control the capacity of the gas compression system in response to a leaving chilled liquid temperature and a system pressure differential.

Certain advantages of the embodiments described herein include the elimination of PRV in centrifugal compressors to reduce the complexity of the HVAC & R system components and controls; and the reduction of operating capacity in a cooling system using a variable geometry diffuser, either alone or in combination with a variable speed drive (VSD) to improve system efficiency at partial load.

DETAILED DESCRIPTION OF THE EXEMPLARY EMBODIMENTS

Figure 1:
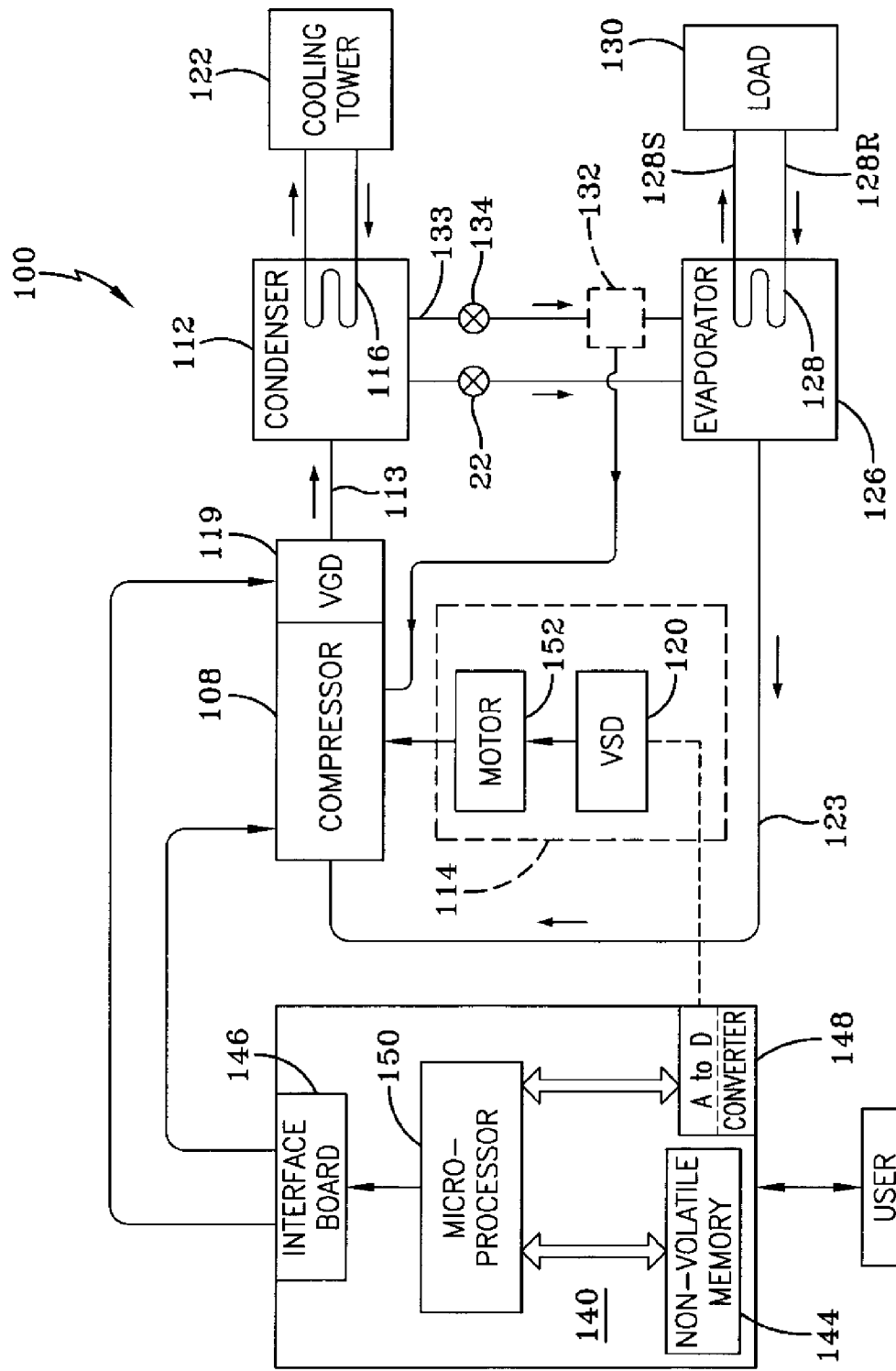
FIG. 1 illustrates an exemplary HVAC & R system to which a variable geometry diffuser may be applied.

A general HVAC & R chiller system 100 to which the invention can be applied is illustrated, by means of example, in FIG. 1. HVAC & R system 100 for controlling a centrifugal gas compressor 108 in, for example, an HVAC & R, or liquid chiller system 100 is described below. Compressor 108 may be a single or multi-stage centrifugal compressor. The flow of refrigerant gas through compressor 108 is automatically controlled to maintain desired parameters within predetermined ranges, and to prevent stall and surge conditions within system 100. A VGD 119 in each stage of the compressor 108 controls the refrigerant gas flow at the discharge of the compressor impeller wheel 201 (See FIG. 2). The arrangement of VGD 119 reduces mass flow, decreases or eliminates flow-reducing stall, and increases the operating efficiency of compressor 108 when operating at partial load conditions. Capacity control using a variable geometry diffuser in combination with a variable speed drive (VSD) 120 increases the efficiency of compressor 108 at partial system loads, and eliminates the need for PRV at an inlet of compressor 108. In an alternate embodiment, VGD 119 may be eliminated from the discharge of one or more stages in a multi-stage compressor 108.

As shown, HVAC & R chiller system 100 includes compressor 108, a condenser 112, a water chiller or evaporator 126, and a control panel 140. Control panel 140 can include an analog to digital (A/D) converter 148, a microprocessor 150, a non-volatile memory 144, and an interface board 146. The operation of control panel 140 will be discussed in greater detail below.

Compressor 108 compresses a refrigerant vapor and delivers the vapor to condenser 112 through a discharge line 113. To drive compressor 108, system 100 includes a motor or drive mechanism 152 for compressor 108. While the term "motor" is used with respect to the drive mechanism for compressor 108, it is to be understood that the term "motor" is not limited to a motor but is intended to encompass any component that can be used in conjunction with the driving of motor 152, such as a variable speed drive and a motor starter. In a preferred embodiment of the present invention, the drive mechanism or motor 152 is an electric motor, a VSD 120 and associated components. However, other drive mechanisms 114 such as steam or gas turbines or engines and associated components such as a variable speed controller, can be used to drive compressor 108.

The refrigerant vapor delivered by compressor 108 to condenser 112 enters into a heat exchange relationship with a fluid, for example, air or water, and undergoes a phase change to a refrigerant liquid as a result of the heat exchange relationship with the fluid. The condensed liquid refrigerant from condenser 112 flows through an expansion device 22 to an evaporator 126. Expansion device 22 may be connected in parallel with a hot gas bypass valve (HGV) 134. A flash gas economizer or intercooler 132 may be connected between condenser 116 and evaporator 126. Economizer 132 introduces refrigerant flash gas to the compressor at a pressure that is between that of the evaporator 126 and the condenser 116. The introduction of intermediate pressure refrigerant gas improves the efficiency of the thermodynamic cycle. In a preferred embodiment, the refrigerant vapor in the condenser 112 enters into the heat exchange relationship with water, flowing through a heat-exchanger 116 connected to a cooling tower 122. The refrigerant vapor in condenser 112 undergoes a phase change to a refrigerant liquid as a result of the heat exchange relationship with the water in heat-exchanger 116.

Evaporator 126 can preferably include a heat-exchanger 128 having a supply line 128S and a return line 128R connected to a cooling load 130. The heat-exchanger 128 can include a plurality of tube bundles (not shown) within evaporator 126. A secondary liquid, which may be water, or any other suitable secondary liquid, for example, ethylene, calcium chloride brine or sodium chloride brine, travels into evaporator 126 via return line 128R and exits evaporator 126 via supply line 128S. The liquid refrigerant in evaporator 126 enters into a heat exchange relationship with the secondary liquid in heat-exchanger 128 to chill the temperature of the secondary liquid in heat-exchanger 128. The refrigerant liquid in evaporator 126 undergoes a phase change to a refrigerant vapor as a result of the heat exchange relationship with the secondary liquid in heat-exchanger 128. The vapor refrigerant in evaporator 126 exits evaporator 126 and returns to compressor 108 by a suction line 123 to complete the cycle. While system 100 has been described in terms of preferred embodiments for condenser 112 and evaporator 126, it is to be understood that any suitable configuration of condenser 112 and evaporator 126 can be used in system 100, provided that the appropriate phase change of the refrigerant in condenser 112 and evaporator 126 is obtained.

Control panel 140 may have an A/D converter 148 to receive input signals from system 100 that indicate the performance of system 100. For example, the input signals received by control panel 140 can include the temperature of the leaving chilled liquid temperature from evaporator 126, refrigerant pressures in evaporator 126 and condenser 112, and an acoustic or sound pressure measurement in the compressor discharge passage. Control panel 140 communicates through interface board 146 to transmit signals to components of the system 100 to control the operation of system 100. For example, control panel 140 can transmit signals to control the position of an optional hot gas bypass valve 134, if present, and to control the position of diffuser ring 210 (See, for example, FIG. 2) in VGD 119.

Control panel 140 uses a control algorithm(s) to control operation of system 100 and to determine when to extend and retract diffuser ring 210 in VGD 119 in response to particular compressor conditions in order to maintain system and compressor stability which, for the purpose of this disclosure, is the absence of stall and surge conditions. Additionally, control panel 140 can use the control algorithm(s) to open and close the optional, hot gas bypass valve (HGV) 134, if present, in response to particular compressor conditions in order to maintain system and compressor stability. In one embodiment, the control algorithm(s) can be computer programs stored in non-volatile memory 144 having a series of instructions executable by microprocessor 150. While the control algorithm be embodied in a computer program(s) and executed by microprocessor 150, it will be understood by those skilled in the art that the control algorithm may be implemented and executed using digital and/or analog hardware. If hardware is used to execute the control algorithm, the corresponding configuration of control panel 140 can be changed to incorporate the necessary components and to remove any components that may no longer be required, for example, A/D converter 148.

Control panel 140 may include analog to digital (A/D) and digital to analog (D/A) converters 148, microprocessor 150, non-volatile memory or other memory device 144, and interface board 146 to communicate with various sensors and control devices of chiller system 100. In addition, control panel 140 can be connected to or incorporate a user interface 194 that permits an operator to interact with control panel 140. The operator can select and enter commands for control panel 140 through user interface 194. In addition, user interface 194 can display messages and information from control panel 140 regarding the operational status of chiller system 100 for the operator. The user interface 194 can be located locally to control panel 140, such as being mounted on chiller system 100 or control panel 140, or alternatively, user interface 194 can be located remotely from control panel 140, such as being located in a separate control room apart from chiller system 100.

Microprocessor 150 may execute or use a single or central control algorithm or control system to control chiller system 100 including compressor 108, VSD 120, condenser 112 and the other components of chiller system 100. In one embodiment, the control system can be a computer program or software having a series of instructions executable by microprocessor 150. In another embodiment, the control system may be implemented and executed using digital and/or analog hardware by those skilled in the art. In still another embodiment, control panel 140 may incorporate multiple controllers, each performing a discrete function, with a central controller that determines the outputs of control panel 140. If hardware is used to execute the control algorithm, the corresponding configuration of control panel 140 can be changed to incorporate the necessary components and to remove any components that may no longer be required.

Control panel 140 of chiller system 100 can receive many different sensor inputs from the components of chiller system 100. Some examples of sensor inputs to control panel 140 are provided below, but it is to be understood that control panel 140 can receive any desired or suitable sensor input from a component of chiller system 100. Some inputs to control panel 140 relating to compressor 108 can be from a compressor discharge temperature sensor, a compressor oil temperature sensor, a compressor oil supply pressure sensor and a VGD position sensor.

The central control algorithm executed by microprocessor 150 on the control panel 140 preferably includes a capacity control program or algorithm to control the speed of motor 152 via VSD 120, and thereby the speed of compressor 108, to generate the desired capacity from compressor 108 to satisfy a cooling load. The capacity control program can automatically determine a desired speed for motor 152 and compressor 108, preferably in direct response to the leaving chilled liquid temperature in evaporator 126, which temperature is an indicator of the cooling load demand on chiller system 100. After determining the desired speed, control panel 140 sends or transmits control signals to VSD 120, thereby regulating the speed of motor 152. In an alternate embodiment, motor 152 may be operated at a fixed speed at a fixed voltage and frequency, and does not receive power from VSD 120.

The capacity control program can be configured to maintain selected parameters of chiller system 100 within preselected ranges. These parameters include prime mover speed, chilled liquid outlet temperature, prime mover power output, and anti-surge limits for minimum compressor speed and variable geometry diffuser position. The capacity control program may employ continuous feedback from sensors monitoring various operational parameters described herein to continuously monitor and change the speed of motor 152 and compressor 108 in response to changes in system cooling loads. That is, as chiller system 100 requires either additional or reduced cooling capacity, the operating parameters of compressor 108 in chiller system 100 are correspondingly updated or revised in response to the new cooling capacity requirement. To maintain maximum operating efficiency, the operating speed of compressor 108 can be frequently changed or adjusted by the capacity control algorithm. Furthermore, separate from system load requirements, the capacity control program may also continuously monitor the refrigerant system pressure differential to optimize the volumetric flow rate of refrigerant in chiller system 100 and to maximize the resultant efficiency of compressor 108.

Motor 152 may be an induction motor 152 that is capable of being driven at variable speeds. Induction motor 152 can have any suitable pole arrangement including two poles, four poles or six poles. Induction motor 152 is used to drive a load, for example, a compressor 108 as shown in FIG. 1. In another embodiment motor 152 may be a synchronous motor with a permanent magnet rotor. In one embodiment, the system 100 and capacity control method can be used to drive a compressor of a refrigeration system.

Figure 2:
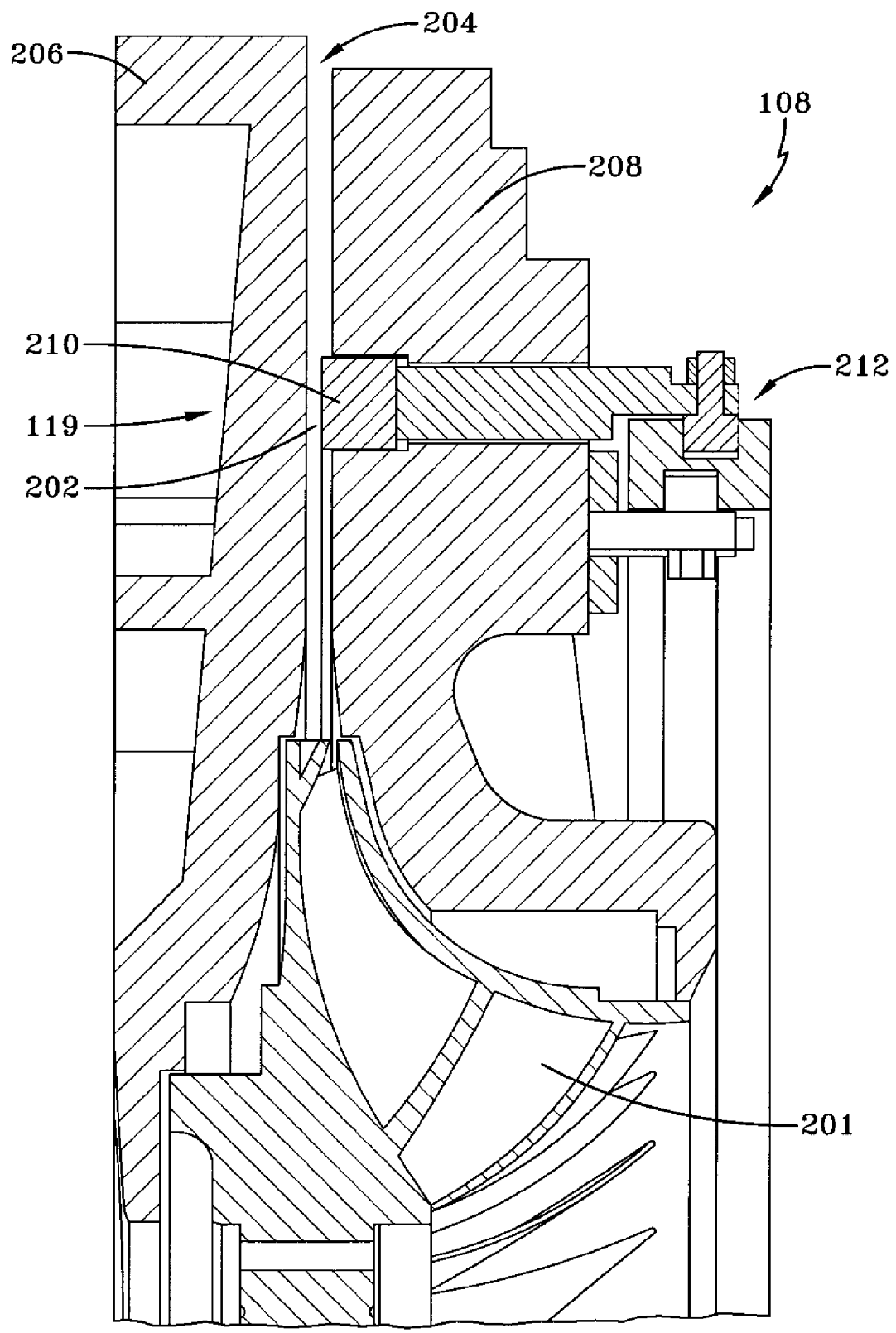
FIG. 2 illustrates a partial sectional view of a centrifugal compressor and variable geometry diffuser used with the present invention.
Figure 3:
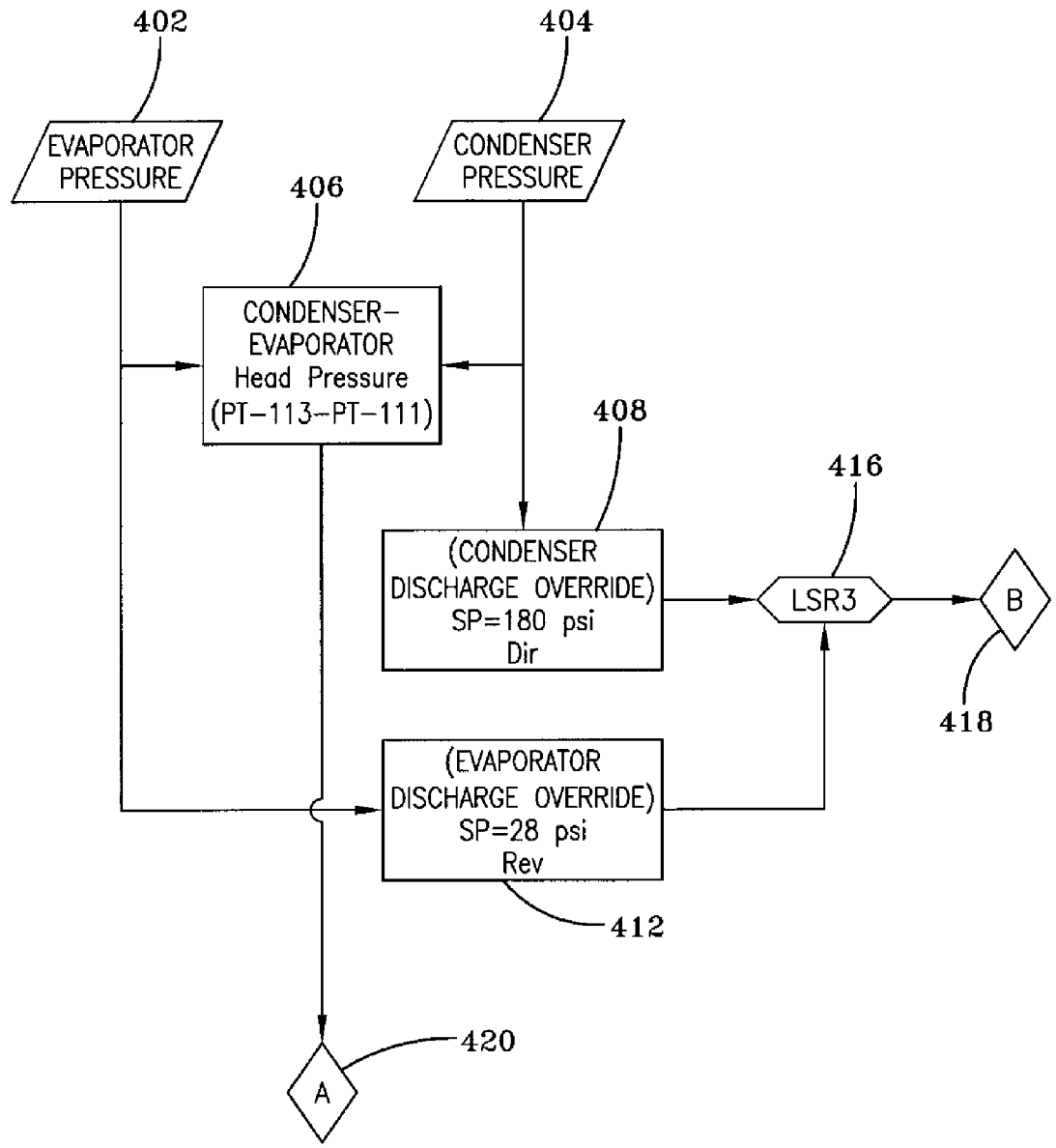
FIG. 3 is a partial schematic diagram of an HVAC & R control system related to system head pressure.

FIG. 2 illustrates a partial sectional view of compressor 108 of an exemplary embodiment of the present disclosure. Compressor 108 includes an impeller 201 for compressing the refrigerant vapor. The compressed vapor then passes through a diffuser 119. Diffuser 119 is preferably a vaneless radial diffuser having a variable geometry. Variable geometry diffuser (VGD) 119 has a diffuser space 204 formed between a diffuser plate 206 and a nozzle base plate 208 for the passage of the refrigerant vapor. Nozzle base plate 208 is configured for use with a diffuser ring 210. Diffuser ring 210 is used to control the velocity of refrigerant vapor that passes through diffuser space or passage 202. Diffuser ring 210 can be extended into diffuser passage 202 to increase the velocity of the vapor flowing through the passage and can be retracted from diffuser passage 202 to decrease the velocity of the vapor flowing through the passage. Diffuser ring 210 can be extended and retracted using an adjustment mechanism 212, driven by an actuator 650 (see FIG. 6A) to provide the variable geometry of VGD 119. A more detailed description of the operation and components of one type of VGD 119 is provided in U.S. patent application Ser. No. 10/313,364, filed on Dec. 6, 2002, now U.S. Pat. No. 6,872,050 issued Mar. 29, 2005, entitled "Variable Geometry Diffuser Mechanism", which patent is hereby incorporated by reference. However, it is to be understood that any suitable VGD 119 can be used with the present invention. Also, more than one VGD 119 may be used to control the flow of refrigerant for compressor impeller or impellers 201, and thus control the capacity of compressor 108. VGD 119 is positionable to any position between a substantially open position, wherein refrigerant flow is substantially unimpeded out of compressor 108, and a substantially closed position, wherein refrigerant flow out of compressor 108 is restricted. It is to be understood that VGD 119, when in the closed position, may not stop completely the flow of refrigerant from compressor 108. Adjustment mechanism 212 can open and close the diffuser gap either continuously, or incrementally in discrete steps.

Figure 4:
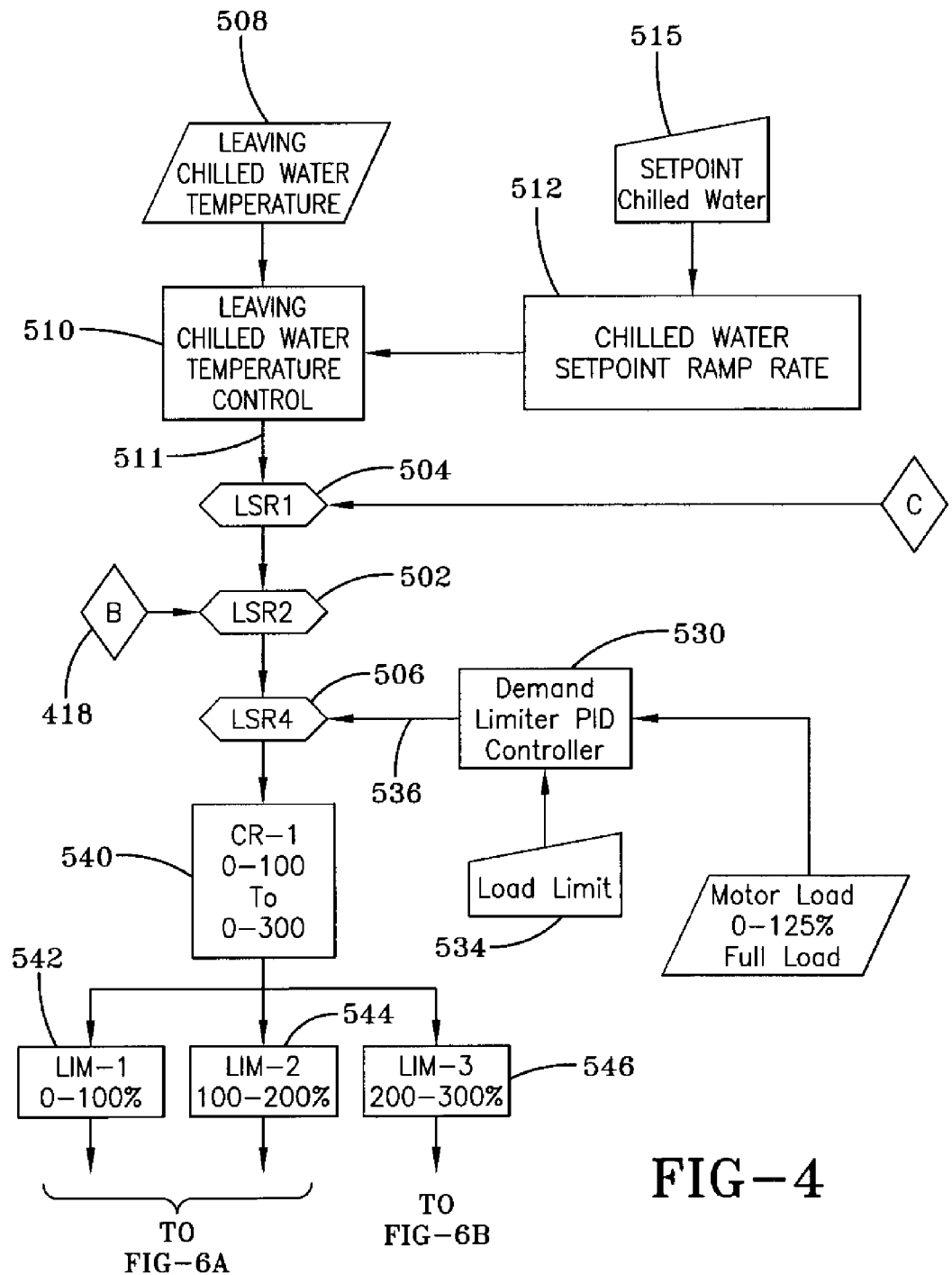
FIG. 4 is a partial schematic diagram of an HVAC & R control system related to chilled water temperature.

The capacity control devices are governed primarily to provide a means of anti-surge. In one embodiment, the capacity control program can control the speed of motor 152 (and compressor 108), the position of hot gas bypass valve 134 in response to changes in the leaving chilled liquid temperature (LCLT) from evaporator 126. FIGS. 4-7 illustrate an embodiment of the capacity control process for the capacity control program of the present invention. FIG. 4 generally illustrates the system head pressure sensing controls for determining the system head pressure input variable (C_SYSTEM HEAD) to VGD 119 position control algorithm 602 (See, for example, FIG. 6A). In block 402 the system senses the evaporator pressure, and in block 404, the system senses the condenser pressure. In block 406, the evaporator pressure value from block 402 is subtracted from the condenser pressure value of block 404. The difference between the evaporator pressure value and the condenser pressure value of block 404 yields the system head pressure. System head pressure may also be defined by other methods such as the difference in saturated temperature conditions. The parameter of interest is mass flow, for example, of gas or refrigerant. Head, or differential, pressure of the system is an analogous parameter indicative of mass flow. Mass flow of gas/refrigerant can also be analogous to temperature, or may be measured directly using suitable instruments.

The condenser pressure is also input to block 408 for proportional/integral/derivative (PID) discharge override, with a set point value of, for example, 180 psi. Similarly, the evaporator pressure is input in block 412 for PID proportional integral derivative discharge override, with a set point value of, for example, 28 psi. The output signal from block 408 and the output signal from block 412 are input to a low selector relay (LSR) 416, and LSR 416 passes the lower value of the two input variables to the next control process diagram section in FIG. 4, as indicated by symbol (B) 418.

Figure 5:
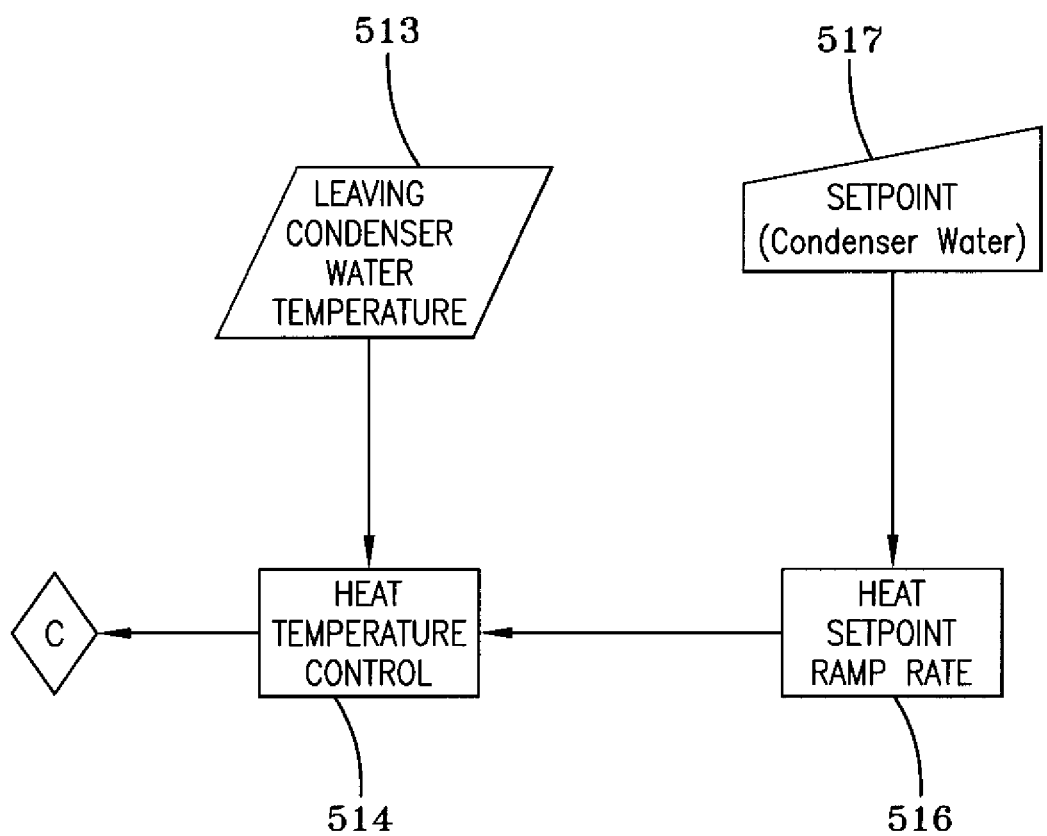
FIG. 5 is a partial schematic diagram of an HVAC & R control system related to condenser water temperature.

Referring next to FIGS. 4 & 5, the output signal of LSR 416 is input to another LSR 502. The leaving chilled water temperature of the system is sensed at block 508. The sensed chilled water temperature is input as a process variable (PV) to a PID chilled water temperature control at block 510. The chilled water temperature is compared to a set point control output at block 512 for controlling the temperature at a predetermined rate of change in degrees Fahrenheit (° F.) per time interval, for example. Chilled water temperature set point originate from control operators 515.

A chilled water temperature control variable output 511 from PID controller 510 is input to a low select relay (LSR) 504 that selects the lower value of the two inputs and forwards the lower value as the output value. A second input to LSR 504 is received from PID heat temperature control 514. Heat temperature control 514 is determined from a leaving condenser temperature 513, and a heat setpoint rate or ramp 516. Heat setpoint ramp 516 receives a condenser water setpoint input 517. The lower value of chilled water PID controller 510 and heat temperature control 513 is input to LSR 502. LSR 502 compares the output value from LSR 504 with a second input representing the system head pressure from block (B) 418. LSR 502 selects the lower of the two input values from block 418 and LSR 504, and inputs the selected value to LSR 506. LSR 506 receives a second input representing the load limit output from PID controller 530. PID controller 530 compares a motor load 532 as a percentage of motor full load, with a load limit setpoint 534, to determine a load limit value 536 that is input to LSR 506. LSR 506 inputs the lesser of input values 502, 536, into a computing relay (CR) 540. CR 540 may be used to determine three operating ranges of chiller system 100 capacity. In the embodiment of FIGS. 3-7, the capacity control device can be considered to have three loading ranges. In a low capacity loading range the system capacity is controlled by HGV 134; in a middle capacity loading range the system capacity is controlled by VGD 119, and in a high capacity loading range the system capacity is controlled by compressor speed. The exemplary embodiment is shown as a three capacity control device, but the control signal may be divided into more or less ranges. The method of capacity control is assigned based on relative efficiency to the sub-section of the range closest to the unloaded capacity value. In the exemplary embodiment HGV corresponds to the least efficient method of capacity control. The most efficient method of capacity control is assigned the sub-section of the capacity range associated with the loaded capacity value, which in the exemplary embodiment is speed control, because is generally considered to be the most efficient method of capacity control. In the exemplary embodiment, the middle range is the center sub-section of the capacity loading range, between the ranges representing most unloaded and most loaded. The VGD is assigned to control capacity in the middle capacity loading range. As the compressor system increases in load from fully unloaded to fully loaded, the capacity devices are sequentially applied over the divided total range. When unloading or loading the compressor speed setpoint, VGD position and HGV position are continuously determined and modulated to obtain an efficient operation, in order to supply the load imposed on the compressor system. Any regions defined as unstable by the anti-surge or anti-stall algorithms (see, for example, Algorithm 1 and Algorithm 2, FIGS. 6A, 6B and 7) are regarded as unusable ranges to be avoided or passed over, and the compressor is prevented from entering these ranges of operation, and the next sub-section of the total range is employed to meet the loading or unloading of the system as commanded by all the algorithms upstream of LSR4.

Figure 6A:
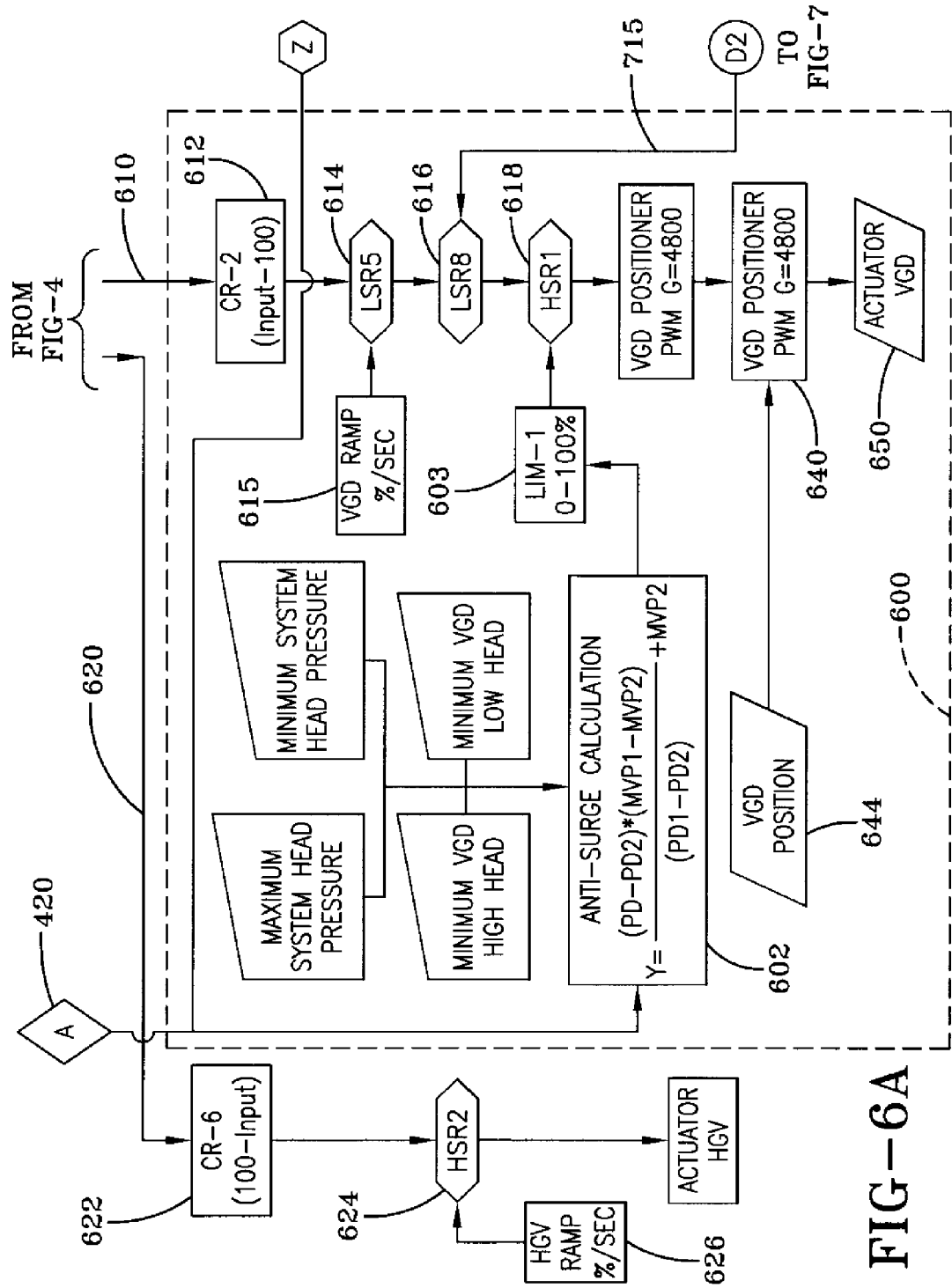
FIG. 6A is a partial schematic diagram of an HVAC & R control system related to system capacity and positioning of a variable geometry diffuser.
Figure 6B:
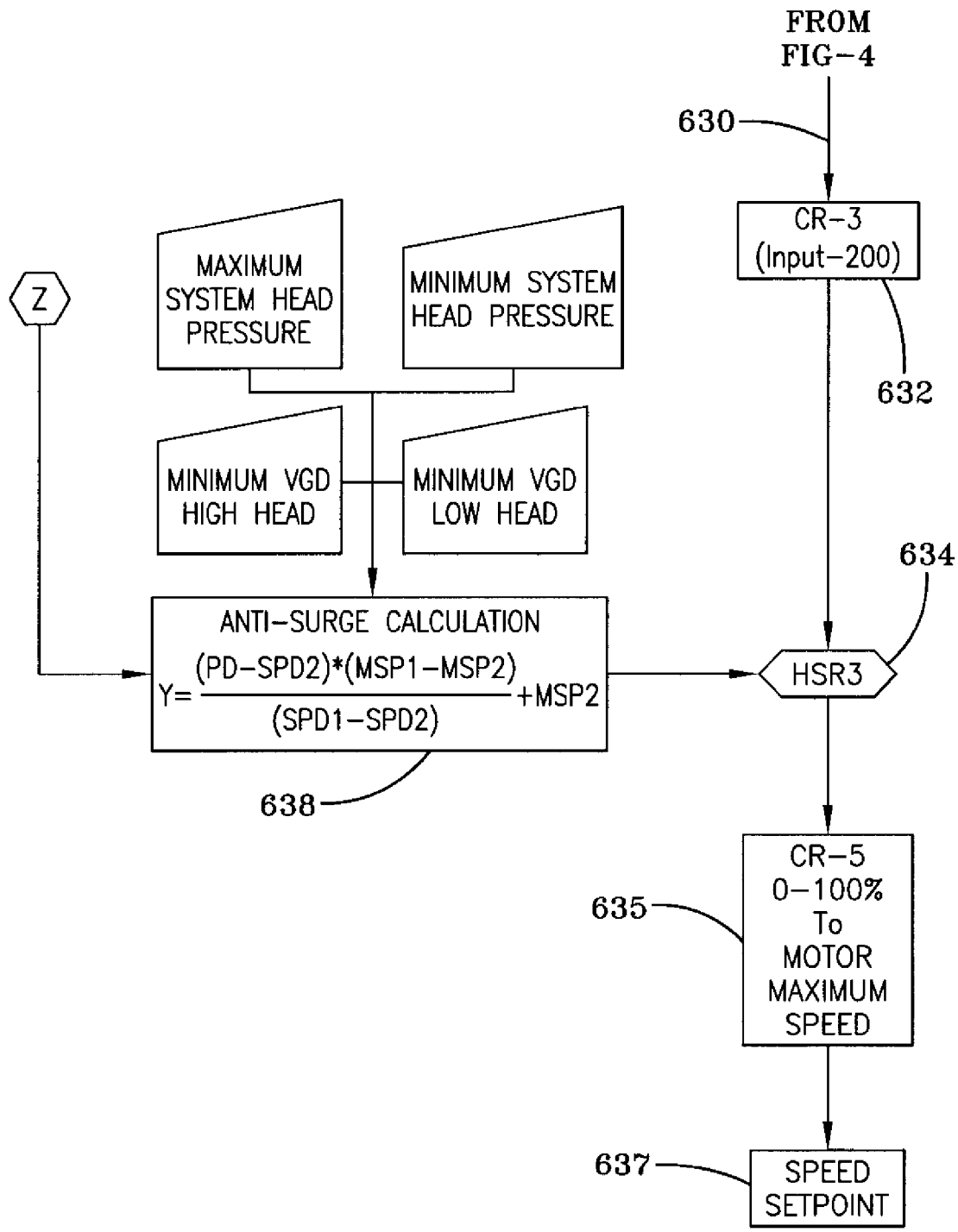
FIG. 6B is a partial schematic diagram of an HVAC & R control system related to compressor speed.

Referring next to FIG. 6A, first limit relay 542 selects path 620 and inputs limit relay 542 output value to computing relay (CR) 622. CR 622 computes the percentage of capacity range value for input to a high select relay (HSR) 624. HSR 624 selects the higher value of the capacity range output from CR 622 and a hot gas valve (HGV) ramp 626, which limits the percentage change per time interval. The greater value of the capacity range output from CR 622 and HGV rate of change limitation algorithm, or ramp 626 from HSR 624 is input to the HGV 625.

The variable geometry diffuser capacity control portion 600 of the control schematic is designated by broken lines. CR 612 receives a capacity signal 610 ranging from 100%-200%. CR 612 normalizes or re-scales the range by subtracting 100 from the input value (Input−100) from path 610, representing a range of 100%-200%. LSR 614 then receives the output of CR 612 at a first input and the variable geometry diffuser ramp range 615 at a second input LSR 614 selects the lower value of the first and second input signals and inputs the selected value to LSR 616. At LSR 616 the lower of the two values of LSR 614 output and an output signal 715 from the anti-stall controller 710 (see, for example FIG. 7) is selected and the selected value input to HSR 618. HSR 618 receives the output of LSR 616, and the output of box 602 and limit switch 603 which computes the minimum anti-surge position. The minimum anti-surge position is generated by applying Algorithm 1 in box 602. The algorithm applied in box 602 is as follows:

$$Y = \frac{(PD - PD2) * (MVP1 - MVP2)}{(PD1 - PD2)} + MVP2 \quad \text{[Algorithm 1]}$$

Algorithm 1 determines the required system capacity Y as a percentage value between 0 and 100% where:
PD=Actual system head pressure
PD1=maximum system head pressure
PD2=minimum system head pressure
MVP1=minimum variable geometry diffuser high head pressure
MVP2=minimum variable geometry diffuser low head pressure Algorithm 1 is one method of computing the anti-surge position and is provided by way of example, however the disclosure is not limited to a specific method of computing the anti-surge position. The actual system head pressure is determined as described above with respect to FIG. 3, and input to algorithm 602.

Returning to HSR 618, the required system capacity of algorithm 602 is compared with the output of LSR 616. The output of LSR 616 represents the lower of the anti-stall control signal 715 or the system capacity demand signal. The higher value of limit switch 603 and LSR 616 is applied to control a variable geometry diffuser motor 650 through a position controller 640. In one embodiment, position controller 640 is a variable geometry diffuser pulse-width-modulated (PWM) position controller. Position controller 640 determines the output signal based on a reference input of the current variable geometry diffuser position, which is determined at block 644.

As described above, the control scheme set forth in FIGS. 3 through 7 provides an integrated capacity control of the compressor system, providing override limitation on pressure and demand limit, anti-surge control, and incipient stall avoidance control. The capacity control of the compressor system is integrated with the use of a VGD 119, without the need for PRV. Referring to FIG. 4 the resultant of LSR4 506 provides the command to unload or load the chiller as represented by a predetermined analog value range. At one extreme of this range the command represents fully unloaded, at the other extreme of this range represents fully loaded. The embodiment of the combination of computing relay 540, limit switch 542, limit switch 544 and limit switch 546 are used to subdivide the analog value range, into predetermined subsections, one sub-section for each capacity control device, as described above with respect to FIG. 4. Computing relay 632 sends the normalized signal to HSR 634. HSR 634 receives a second input signal, representing a minimum speed setpoint Y, from box 632. The minimum speed setpoint Y is determined by application of Algorithm 2 in box 638 as follows:

$$Y = \frac{(PD - SPD2) * (MSP1 - MSP2)}{(SPD1 - SPD2)} + MSP2 \quad \text{[Algorithm 2]}$$

Algorithm 2 determines the minimum speed Y for anti-surge calculation where:
SPD1=maximum system head pressure
SPD2=minimum system head pressure
MSP1=minimum speed high head pressure
MSP2=minimum speed low head pressure The minimum rotational speed of compressor 108 is defined by differential pressure representing head pressure requirements of compressor 108, compared to the rotation speed of compressor 108, representing mass flow with a fully-open diffuser gap. For each given head pressure requirement of compressor 108, there is a corresponding minimum rotational speed that is required to prevent a surge condition from occurring in compressor 108. Algorithm 2 represents an exemplary embodiment of anti-surge logic for compressor 108. The parameters set forth above may be determined empirically, or by a surge detection algorithm similar to Algorithm 2. Other surge detection algorithms are known by those skilled in the art, which may be substituted for Algorithm 2.

Minimum gas flow considerations also are taken into account on the closing of the discharge diffuser gap 202. For each head pressure requirement there is a corresponding minimum opening or gap width that is required for the diffuser to control a predetermined mass flow to pass through the impeller wheel 201 of compressor 108. If the diffuser gap is too large, the diffuser will cause surge to occur in compressor 108 by impeding the mass flow through compressor 108. Algorithm 2 is an exemplary embodiment of anti-surge algorithm 602 (FIG. 6A).

The compressor motor speed as a percentage between zero and 100% of full motor speed is then compared with the speed range percentage output from computing relay CR 632, and the higher percentage value of the two percentages is input to a variable speed drive (VSD), which adjusts the speed of the compressor drive motor accordingly. As shown in the embodiment in FIG. 6, the output of HSR 634, representing the greater value of the speed percentage output from CR 632 and anti-surge speed value output of CR 636, is applied to CR 635. CR 635 translates the input value from CR 634 into a proportional signal ranging from zero to 100% of the motor maximum speed, and outputs a speed setpoint at block 637. The speed setpoint signal from block 637 is input to VSD 120 for controlling the compressor motor speed. An optional selector switch 639 may be connected between HSR 634 and CR 635 to permit manual speed setpoint selection.

Figure 7:
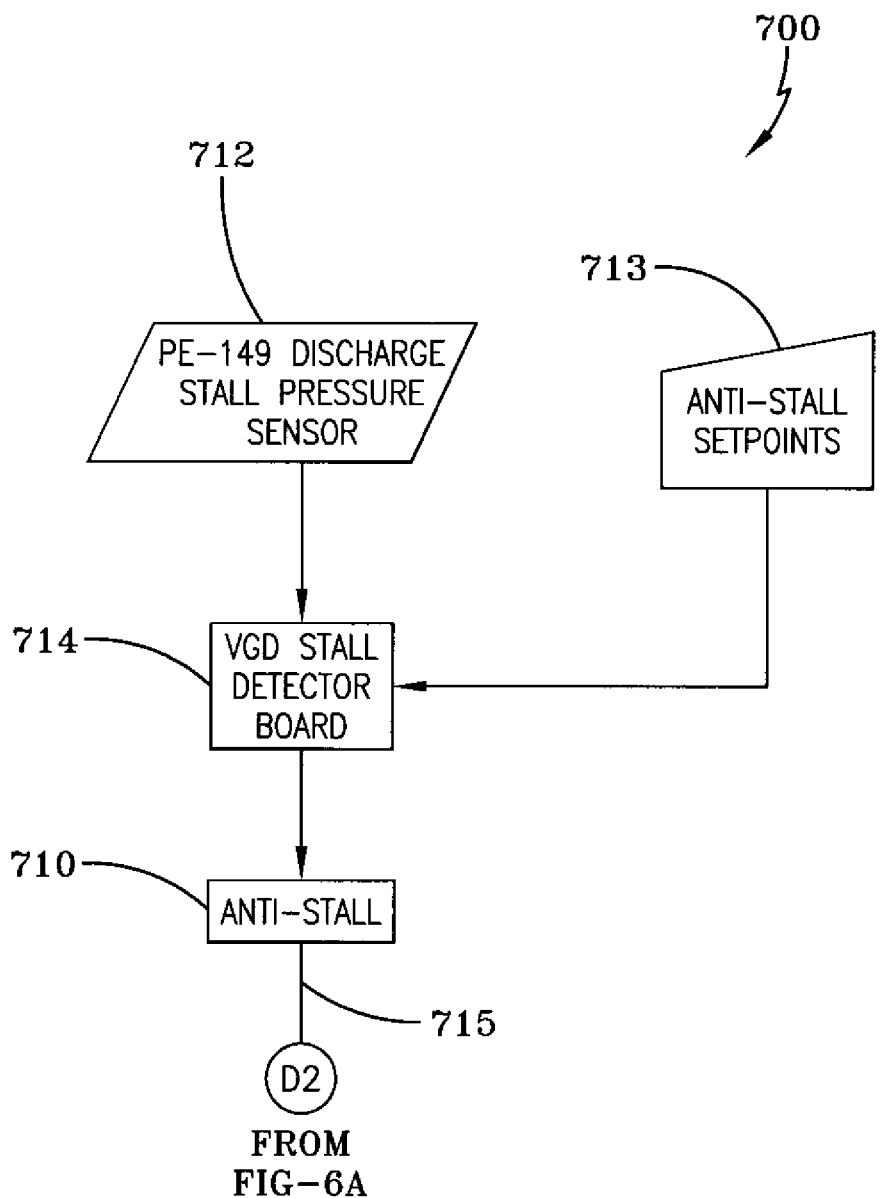
FIG. 7 is a partial schematic diagram of an HVAC & R control system related to anti-stall detection.

Referring next to FIG. 7, an anti-stall control circuit 700 includes a discharge stall pressure sensor 712. The signal from sensor 712 is applied to a variable geometry diffuser stall detector board 714, where the signal representing the discharge pressure is processed and input as a process variable to the anti-stall Direct-Acting (DIR) controller 710. Stall detector board 714 may be incorporated into control panel 140, or a separate, a standalone module that is in data communication with control panel 140. The actual discharge pressure is processed to yield a set of stall-related parameters, which are compared with a set of stall-related setpoint values 713, including but not limited to: noise voltage deadband, starting position, maximum and minimum Control Variable (CV), probe rate, wait time, reaction ramp, and signal setpoint stall threshold.

An anti-stall algorithm is implemented generally in FIG. 7. A stall unload signal 715 is output from the anti-stall controller 710. The anti-stall algorithm is integrated into the compressor control scheme as an unload algorithm when a high noise condition is detected as a result of stall parameters described above. Stall unload signal 715 is overridden by Algorithm 1 above at HSR 618. A plurality of setpoints 713 is inserted to controller 710, including but not limited to, variable geometry diffuser noise deadband, variable geometry diffuser probe rate, wait time, reaction/ramp rate maximum CV and minimum CV.

In another embodiment the capacity control system may be implemented using a steam turbine to drive compressor 108. The steam turbine replaces the VSD 120 and motor 152 shown in FIG. 1, to provide an alternative prime mover 114 for powering compressor 108. Commonly owned U.S. Pat. No. 7,328,587, entitled "INTEGRATED ADAPTIVE CAPACITY CONTROL FOR A STEAM TURBINE POWERED CHILLER UNIT", herein incorporated by reference in its entirety, discloses a steam turbine powered chiller unit in which there are one or more PRV or inlet guide vanes that control the flow of refrigerant provided to the compressor, and thereby control the capacity of the compressor. A steam turbine-driven chiller system may be modified to eliminate the PRV and incorporate the VGD 119 and associated controls as described above with respect to FIGS. 3 through 7.

In the embodiment illustrated in FIG. 1, a hot gas bypass connection 133 and HGV 134 connect refrigerant condenser 116 and evaporator 126 and bypass an expansion device 22. In another embodiment, hot gas bypass connection 133 and hot gas bypass valve 134 can connect a compressor suction line 123 and a compressor discharge line 113. Hot gas bypass valve 134 is preferably used as a recirculation line for compressor 108 to recirculate refrigerant gas from discharge line 113 of compressor 108, via refrigerant condenser 116, to suction line 123 of compressor 108, via evaporator 126. Hot gas bypass valve 134 can be adjusted to any position between a substantially open position, wherein refrigerant flow is essentially unimpeded, and a substantially closed position, wherein refrigerant flow is restricted. Hot gas bypass valve 134 can be opened and closed in either a continuous manner or in a stepped or incremental manner. The opening of hot gas bypass valve 134 can increase the amount of refrigerant gas supplied to the compressor suction to prevent surge conditions from occurring in compressor 108.

Figure 8:
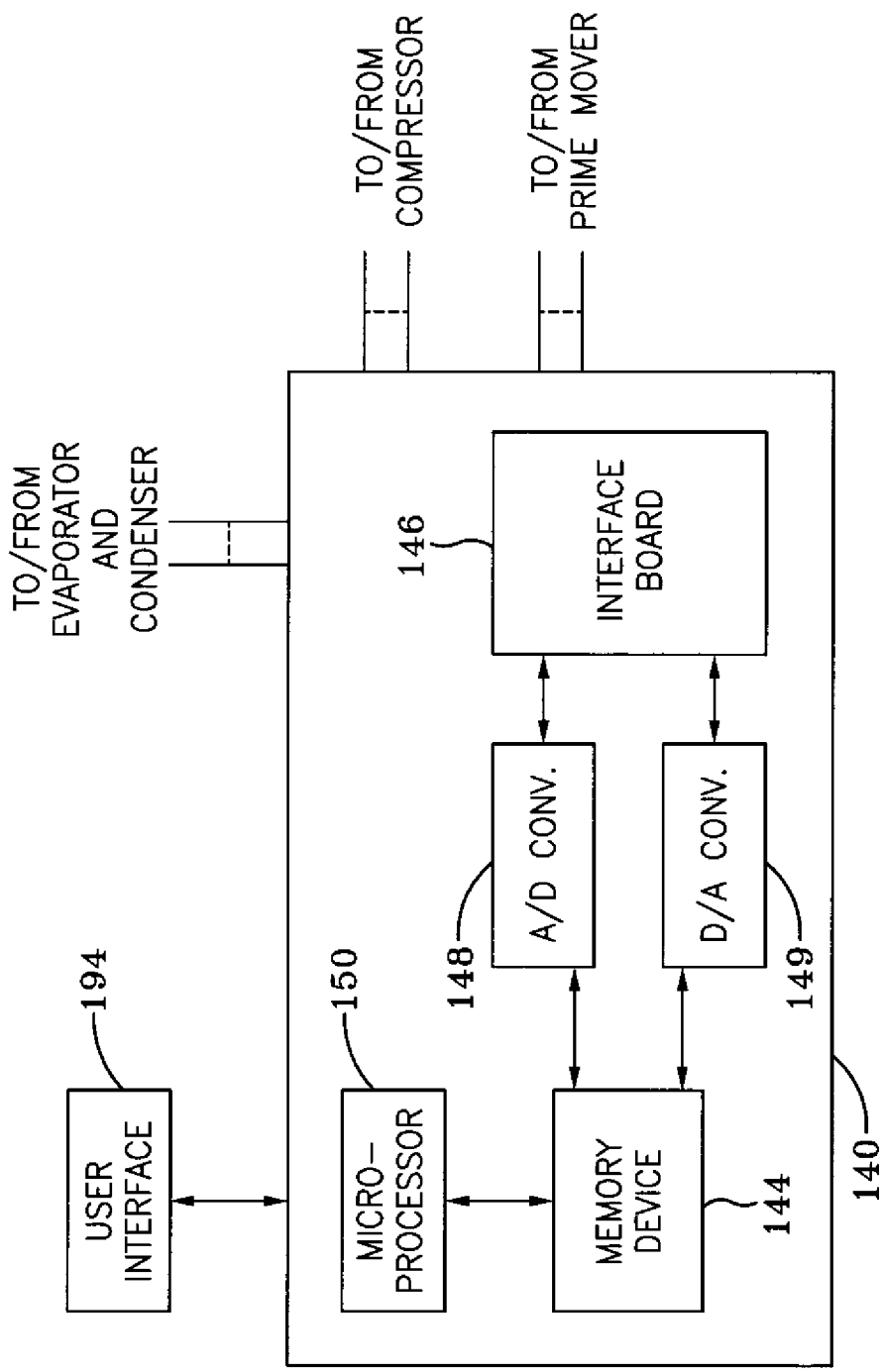
FIG. 8 is a schematic representation of the control system of the chiller unit.

FIG. 8 shows a schematic diagram of an embodiment of control system 140 for a chiller system 100, modified to integrate additional inputs and controls for operation of prime mover 114. As illustrated in FIG. 8, control panel 140 includes an analog to digital (A/D) converter 148 and a digital to analog (D/A) converter 149, a microprocessor 150, a non-volatile memory or other memory device 144, and an interface board 146 to communicate with various sensors and control devices of chiller system 100. In addition, control panel 140 can be connected to or incorporate a user interface 194 that permits an operator to interact with control panel 140. The operator can select and enter commands for control panel 140 through user interface 194. In addition, user interface 194 can display messages and information from control panel 140 regarding the operational status of chiller system 100 for the operator. User interface 194 can be located locally to control panel 140, such as being mounted on chiller system 100 or control panel 140, or alternatively, the user interface 194 can be located remotely from control panel 140, such as being located in a separate control room apart from chiller system 100.

Microprocessor 150 executes or uses a single or central control algorithm or control system to control chiller system 100 including compressor 108, prime mover 114 and the other components of chiller system 100. In one embodiment, the control system can be a computer program or software having a series of instructions executable by microprocessor 150. In another embodiment, the control system may be implemented and executed using digital and/or analog hardware by those skilled in the art. In still another embodiment, control panel 140 may incorporate multiple controllers, each performing a discrete function, with a central controller that determines the outputs of control panel 140. If hardware is used to execute the control algorithm, the corresponding configuration of control panel 140 can be changed to incorporate the necessary components and to remove any components that may no longer be required.

Control panel 140 of chiller system 100 can receive many different sensor inputs from the components of chiller system 100. Some examples of sensor inputs to control panel 140 are provided below, but it is to be understood that control panel 140 can receive any desired or suitable sensor input from a component of chiller system 100. Some inputs to control panel 140 relating to compressor 108 can be from a compressor discharge temperature sensor, a compressor oil temperature sensor, a compressor oil supply pressure sensor and a variable geometry diffuser position sensor.

Some inputs to control panel 140 relating to refrigerant condenser 112 can be from an entering refrigerant condenser water temperature sensor, a leaving condenser water temperature sensor, a refrigerant liquid temperature sensor, a refrigerant condenser pressure sensor, a subcooler refrigerant liquid level sensor, and a refrigerant condenser water flow sensor. Some inputs to control panel 140 relating to evaporator 128 can be from a leaving chilled liquid temperature sensor, a return chilled liquid temperature sensor, an evaporator refrigerant vapor pressure sensor, a refrigerant liquid temperature sensor, and a chilled water flow sensor. In addition, other inputs to controller 140 include a HVAC&R demand input from a thermostat or other similar temperature control system.

Furthermore, control panel 140 of chiller system 100 can provide or generate many different control signals for the components of chiller system 100. Some examples of control signals from control panel 140 are provided below, but it is to be understood that control panel 140 can provide any desired or suitable control signal for a component of chiller system 100. Some control signals from control panel 140 can include a compressor oil heater control signal, a variable speed oil pump control signal, a hot gas bypass valve control signal, a subcooler refrigerant liquid level control signal, a variable geometry diffuser position control signal. In addition, control panel 140 can send a signal to shut down prime mover 114 when either the technician has input a shutdown command into user interface 194, or when a deviation is detected from a preselected parameter recorded in memory device 144.

The central control algorithm also includes other algorithms and/or software that provide control panel 140 with a monitoring function of various operational parameters for chiller system 100 during both startup and routine operation of chiller system 100. Any undesirable operational parameters can be programmed into control panel 140 with a logic function to shutdown chiller system 100. Additionally, the central control algorithm has preselected limits for many of the operational parameters of chiller system 100 and can prevent a technician from manually operating chiller system 100 outside of these limits.

In a preferred embodiment, the capacity control program can control the speed of compressor 108, the position of VGD 119 and the position of hot gas bypass valve 134 in response to changes in the leaving chilled liquid temperature (LCLT) from evaporator 126. FIGS. 3-7 illustrate an embodiment of the capacity control process for the capacity control program of the present invention.

Figure 9:
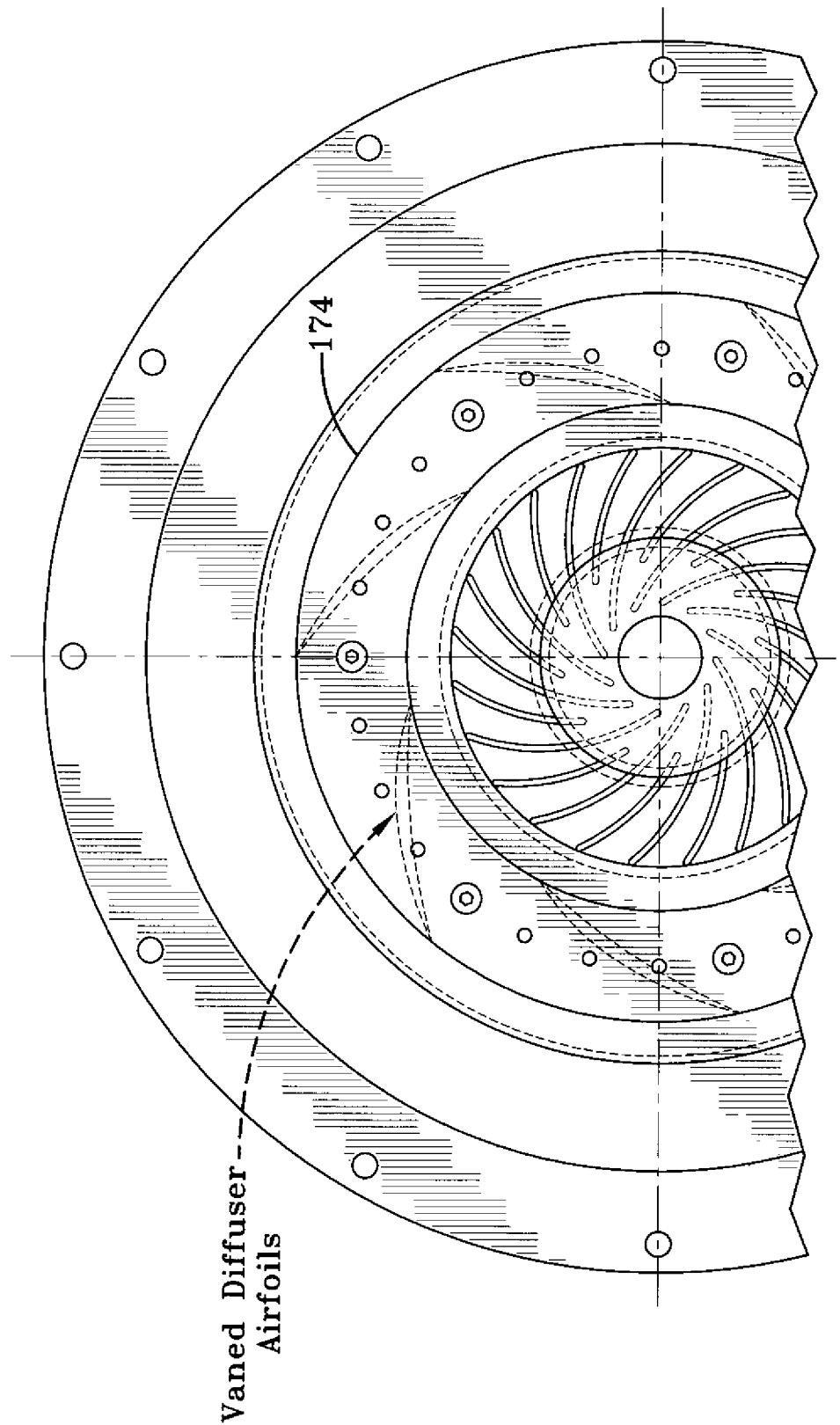
FIG. 9 illustrates a low solidity vaned diffuser.

Referring next to FIG. 9, in another embodiment vaned diffusers can be used in combination with VGD 119 and with variable speed controls to provide even higher compressor efficiency, and to provide additional capacity control. Unlike PRV, which are located on the low-pressure side of impeller 201, vaned diffusers are located on the high-pressure side of the impeller 201. A centrifugal compressor with no vanes on the high-pressure side is referred to as vaneless diffuser compressor. A vaned diffuser 174 is depicted in FIG. 9.

It should be understood that the application is not limited to the details or methodology set forth in the following description or illustrated in the figures. It should also be understood that the phraseology and terminology employed herein is for the purpose of description only and should not be regarded as limiting. While the disclosed embodiments refer specifically to compressor capacity control for HVAC&R chiller systems, process machines in which a process might require chilled liquid or a gas at a given temperature or other condition, VGD 119 can be employed to control capacity of compressor 108.

While only certain features and embodiments of the invention have been illustrated and described, many modifications and changes may occur to those skilled in the art (for example, variations in sizes, dimensions, structures, shapes and proportions of the various elements, values of parameters (for example, temperatures, pressures, etc.), mounting arrangements, use of materials, colors, orientations, etc.) without materially departing from the novel teachings and advantages of the subject matter recited in the claims. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A method of controlling the capacity of a gas compression system having a compressor, a refrigerant condenser, and an evaporator connected in a refrigerant loop, the method comprising the steps of:
providing a variable geometry diffuser at a compressor discharge;
sensing a value representative of a load of the gas compression system;
determining a system pressure differential of the gas compression system;
controlling a position of the variable geometry diffuser in response to the sensed load value and the determined system pressure differential to control a capacity of the gas compression system; wherein the gas compression system has no controllable vanes disposed at an inlet of the compressor.

2. The method of claim 1 further comprising the steps of:
providing a prime mover controllably operable at a variable speed for driving the compressor,
controlling a speed of the prime mover in response to the sensed load value and the determined system pressure differential.

3. The method of claim 2 further comprising the steps of:
providing a hot gas bypass valve to regulate flow of refrigerant between a high pressure side of the gas compression system and a low pressure side of the gas compression system; and
controlling the hot gas bypass valve in response to the sensed load value and the determined system pressure differential to control the capacity of the gas compression system.

4. The method of claim 3 wherein:
the step of controlling a speed of the prime mover includes adjusting a speed of the compressor to maintain a desired system load condition; the step of controlling a position of the diffuser includes positioning the diffuser in a predetermined minimum position, wherein the predetermined minimum position is based on the system pressure differential; and
the step of controlling the hot gas bypass valve includes positioning the hot gas bypass valve in a closed position.

5. The method of claim 3, further comprising:
sensing a plurality of gas compression system operating parameters indicative of a surge condition or an incipient stall condition;
detecting an onset of a surge condition or an incipient stall condition; and
overriding the response to the sensed load value and the determined system pressure differential in response to the detecting an onset of a surge condition or an incipient stall condition.

6. The method of claim 4, wherein the predetermined minimum position for the diffuser prevents the compressor from operating in a surge condition 7. The method of claim 3 wherein:
the step of controlling a speed of the prime mover includes operating the compressor at a predetermined minimum speed, wherein the predetermined minimum speed is based on the system pressure differential;
the step of controlling a position of the diffuser includes adjusting a position of the diffuser to maintain a desired system load condition; and
the step of controlling the hot gas bypass valve includes positioning the hot gas bypass valve in a closed position.

8. The method of claim 4 wherein the predetermined minimum speed for the prime mover prevents the compressor from operating in a surge condition.

9. The method of claim 3 wherein:
the step of controlling the speed of the prime mover includes operating the compressor at a predetermined minimum speed, wherein the predetermined minimum speed is based on the system pressure differential;
the step of controlling a position of the diffuser includes positioning the diffuser in a predetermined minimum position, wherein the predetermined minimum position is based on the system pressure differential; and
the step of controlling the hot gas bypass valve includes adjusting a position of the hot gas bypass valve to maintain a desired system load condition.

10. The method of claim 2 wherein the step of controlling a position of the diffuser includes:
determining a minimum position for the diffuser in response to the determined system pressure differential, wherein the determined minimum position for the diffuser prevents the compressor from operating in a surge condition; and
sending a control signal to the diffuser to set a position of the variable geometry diffuser to the determined minimum position.

11. The method of claim 1 wherein the step of controlling a speed of the compressor includes:
   determining a minimum speed for the compressor in response to the determined system pressure differential, wherein the determined minimum speed for the compressor prevents the compressor from operating in a surge condition; and
   sending a control signal to the compressor to set a speed of the compressor to the determined minimum speed.

12. The method of claim 1 wherein the step of sensing a value representative of a load of the gas compression system includes determining a leaving chilled liquid temperature from the evaporator.

13. The method of claim 1 wherein the step of determining a system pressure differential includes:
   measuring a condenser pressure;
   measuring an evaporator pressure;
   and subtracting the measured evaporator pressure from the measured condenser pressure to determine the system pressure differential.

14. The method of claim 2 wherein the prime mover is a steam turbine.

15. The method of claim 2, wherein the prime mover is a motor powered by a variable speed drive.

16. A gas compression system having a compressor, a refrigerant condenser, and an evaporator connected in a refrigerant loop, the gas compression system comprising:
   a diffuser disposed at a discharge of the compressor, the diffuser configured to regulate flow of refrigerant from the compressor; the gas compression system having no controllable vanes disposed at an inlet of the compressor; and
   a central control panel gas compression system comprising a capacity control system, the capacity control system being configured to adjust a position of the diffuser to control the capacity of the gas compression system in response to a leaving chilled liquid temperature and a system pressure differential.

17. The gas compression system of claim 16 wherein:
the gas compression system further comprises the capacity control system being configured to adjust a speed of the compressor in response to a leaving chilled liquid temperature and a system differential pressure.

18. The gas compression system of claim 17 wherein:
the gas compression system further comprises a hot gas bypass valve to regulate flow of refrigerant between a high pressure side of the gas compression system and a low pressure side of the gas compression system; and
   the capacity control system being configured to adjust a position of the hot gas bypass valve to control the capacity of the gas compression system in response to a leaving chilled liquid temperature and a system pressure differential.

19. The gas compression system of claim 18, wherein the control system is further configured to:
   detect an onset of a surge condition or an incipient stall condition; and
   override the response to the chilled liquid temperature and the determined system pressure differential in response to detecting an onset of a surge condition or an incipient stall condition.

20. The gas compression system of claim 18 wherein the capacity control system is configured to control the diffuser, the hot gas bypass valve and the speed of the compressor to prevent the compressor from operating in a surge condition.

21. The gas compression system of claim 18 wherein the capacity control system is configured to operate in one of a hot gas bypass control mode, a diffuser control mode, or a turbine speed control mode to control the capacity of the gas compression system.

22. The gas compression system of claim 21 wherein:
   the hot gas bypass control mode includes operation at a predetermined minimum turbine speed and a predetermined minimum diffuser position;
   the diffuser control mode includes operation with a closed hot gas bypass valve and at a predetermined minimum turbine speed; and
   the turbine speed control mode includes operation with a closed hot gas bypass valve and at a predetermined minimum diffuser position.

23. The gas compression system of claim 16, wherein the diffuser further comprises vanes.

24. The gas compression system of claim 23, wherein the vanes are selected from one of low solidity and high solidity vanes.

25. The gas compression system of claim 17, further comprising a steam turbine and a steam condenser connected in a steam loop, wherein the compressor is driven by the steam turbine.

26. The gas compression system of claim 16, further comprising a variable speed drive controllable to vary the speed of the compressor.

27. The gas compression system of claim 16, wherein the compressor comprises multiple stages, each stage of the multiple stage compressor having a discharge diffuser disposed therein.

* * * * *

US008567207C1

(12) EX PARTE REEXAMINATION CERTIFICATE (10306th)

United States Patent
Sommer et al.

(10) Number: US 8,567,207 C1
(45) Certificate Issued: Oct. 2, 2014

(54) COMPRESSOR CONTROL SYSTEM USING A VARIABLE GEOMETRY DIFFUSER

(75) Inventors: Steven Trent Sommer, York, PA (US); John Trevino, Jr., York, PA (US); Florin Iancu, York, PA (US); Rudy Chervil, Mountville, PA (US); Eric John Smyder, York, PA (US)

(73) Assignee: Johnson Controls Technology Company, Holland, MI (US)

Reexamination Request:
No. 90/013,160, Feb. 24, 2014

Reexamination Certificate for:
Patent No.: 8,567,207
Issued: Oct. 29, 2013
Appl. No.: 12/681,686
Filed: Apr. 5, 2010

(21) Appl. No.: 90/013,160

(22) PCT Filed: Oct. 30, 2008

(86) PCT No.: PCT/US2008/081747
§ 371 (c)(1),
(2), (4) Date: Apr. 5, 2010

(87) PCT Pub. No.: WO2009/058975
PCT Pub. Date: May 7, 2009

Related U.S. Application Data

(60) Provisional application No. 60/984,073, filed on Oct. 31, 2007.

(51) Int. Cl.
*F25B 1/00* (2006.01)

(52) U.S. Cl.
USPC ....... 62/228.1; 62/196.1; 62/228.4; 62/228.5; 415/47; 415/150

(58) Field of Classification Search
None
See application file for complete search history.

(56) References Cited

To view the complete listing of prior art documents cited during the proceeding for Reexamination Control Number 90/013,160, please refer to the USPTO's public Patent Application Information Retrieval (PAIR) system under the Display References tab.

*Primary Examiner* — Jeffrey R Jastrzab

(57) ABSTRACT

A system for controlling a centrifugal gas compressor (108) in an HVAC, refrigeration or liquid chiller system (100) in which flow of gas through the compressor is automatically controlled to maintain desired parameters within predetermined ranges so as to prevent stall and surge conditions within the system. A variable geometry diffuser (119) in the compressor controls the refrigerant gas flow at the discharge of the compressor impeller wheel (201). This arrangement reduces mass flow, decrease/eliminate flow-reducing stall, and increases the operating efficiency of the compressor at partial load conditions. The variable geometry diffuser control in combination with a variable speed drive (VSD) (120) increases the efficiency of the compressor at partial system loads, and eliminates the need for pre-rotation vanes at the inlet of the centrifugal compressor.

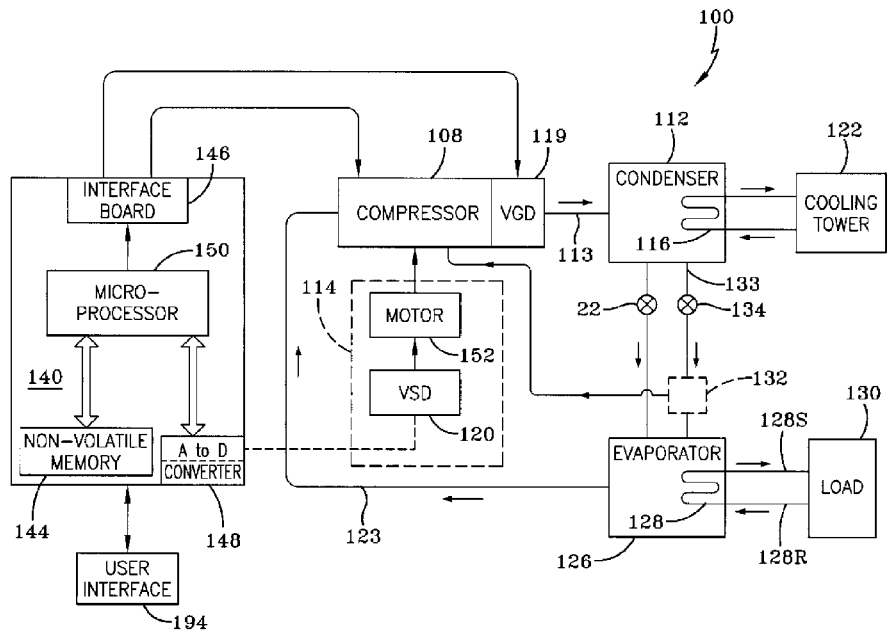

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 16 are determined to be patentable as amended.

Claims 2-15 and 17-27, dependent on an amended claim, are determined to be patentable.

1. A method of controlling the capacity of a gas compression system having a compressor, a refrigerant condenser, and an evaporator connected in a refrigerant loop, the method comprising the steps of:

providing a *vaneless* variable geometry diffuser at a compressor discharge;

sensing a value representative of a load of the gas compression system;

determining a system pressure differential of the gas compression system;

controlling a position of the variable geometry diffuser in response to the sensed load value and the determined system pressure differential to control a capacity of the gas compression system; *wherein the gas compression system has no controllable vanes disposed at an inlet of the compressor*.

16. A gas compression system having a compressor, a refrigerant condenser, and an evaporator connected in a refrigerant loop, the gas compression system comprising:

a *vaneless* diffuser disposed at a discharge of the compressor, the diffuser configured to regulate flow of refrigerant from the compressor; *the gas compression system having no controllable vanes disposed at an inlet of the compressor*; and a central control panel gas compression system comprising a capacity control system, the capacity control system being configured to adjust a position of the diffuser to control the capacity of the gas compression system in response to a leaving chilled liquid temperature and a system pressure differential.

* * * * *